United States Patent
Li et al.

(10) Patent No.: US 11,291,044 B2
(45) Date of Patent: Mar. 29, 2022

(54) APPARATUSES AND METHODS FOR PREAMBLE SEQUENCE MANAGEMENT FOR CONTENTION BASED ACCESS

(71) Applicant: Nokia Technologies Oy, Espoo (FI)

(72) Inventors: Zexian Li, Espoo (FI); Yuantao Zhang, Beijing (FI); Yanji Zhang, Beijing (CN); Juha Sakari Korhonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/313,953

(22) PCT Filed: Jul. 4, 2016

(86) PCT No.: PCT/CN2016/088415
§ 371 (c)(1),
(2) Date: Dec. 28, 2018

(87) PCT Pub. No.: WO2018/006245
PCT Pub. Date: Jan. 11, 2018

(65) Prior Publication Data
US 2019/0239251 A1   Aug. 1, 2019

(51) Int. Cl.
*H04W 48/16* (2009.01)
*H04W 74/08* (2009.01)
(Continued)

(52) U.S. Cl.
CPC ....... *H04W 74/0808* (2013.01); *H04L 5/0053* (2013.01); *H04L 5/0091* (2013.01);
(Continued)

(58) Field of Classification Search
None
See application file for complete search history.

(56) References Cited

U.S. PATENT DOCUMENTS

| 9,137,827 B1 | 9/2015 | Marupaduga et al. |
| 2012/0275381 A1 | 11/2012 | Kim et al. |

(Continued)

FOREIGN PATENT DOCUMENTS

| WO | 2008/111821 A1 | 9/2008 |
| WO | 2012/044240 A1 | 4/2012 |
| WO | 2015/066916 A1 | 5/2015 |

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211, V13.1.0, Mar. 2016, pp. 1-155.

(Continued)

*Primary Examiner* — Sithu Ko
(74) *Attorney, Agent, or Firm* — Harrington & Smith

(57) ABSTRACT

Systems, methods, apparatuses, and computer program products of preamble sequence management for contention based access are provided. One method may include a user equipment sending a contention based access (CBA) request message, such as a random access procedure (RACH) message, to a network node (e.g., a base station or eNB). The CBA request message may include an indication that the user equipment wants to obtain a preamble for CBA data transmission and is not for full network access. The method may then include receiving an allocation of a preamble for CBA from the network node.

20 Claims, 8 Drawing Sheets

(51) Int. Cl.
H04W 74/00 (2009.01)
H04L 5/00 (2006.01)
(52) U.S. Cl.
CPC ....... H04W 74/004 (2013.01); H04W 74/006 (2013.01); H04W 74/0833 (2013.01)

(56) References Cited

U.S. PATENT DOCUMENTS

| | | | |
|---|---|---|---|
| 2012/0281566 A1* | 11/2012 | Pelletier | H04W 72/1221 370/252 |
| 2014/0140304 A1* | 5/2014 | Yang | H04W 12/062 370/329 |
| 2014/0269605 A1* | 9/2014 | Pecen | H04W 74/0858 370/330 |
| 2017/0070987 A1* | 3/2017 | Lee | H04L 5/0091 |
| 2017/0171859 A1* | 6/2017 | Nimbalker | H04W 72/042 |
| 2017/0188352 A1* | 6/2017 | Lee | H04L 1/1854 |
| 2017/0188532 A1* | 7/2017 | Bachlava | A01H 1/04 |
| 2018/0063869 A1* | 3/2018 | Zhang | H04W 74/004 |
| 2018/0070374 A1* | 3/2018 | Yi | H04B 7/2668 |
| 2018/0092126 A1* | 3/2018 | Yi | H04W 74/02 |
| 2018/0124824 A1* | 5/2018 | Lee | H04W 48/16 |
| 2018/0124829 A1* | 5/2018 | Lee | H04L 5/00 |
| 2018/0199381 A1* | 7/2018 | Rong | H04W 74/08 |
| 2018/0295644 A1* | 10/2018 | Yi | H04L 1/1848 |

OTHER PUBLICATIONS

International Search Report and Written Opinion received for corresponding Patent Cooperation Treaty Application No. PCT/CN2016/088415, dated Apr. 5, 2017, 11 pages.

* cited by examiner

APPARATUSES AND METHODS FOR PREAMBLE SEQUENCE MANAGEMENT FOR CONTENTION BASED ACCESS

RELATED APPLICATION

This application was originally filed as PCT Application No. PCT/CN2016/088415 on Jul. 4, 2016.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), and/or 5G radio access technology. Some embodiments may generally relate to contention based access (CBA), small packet transmission, and/or machine type communication (MTC).

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency.

SUMMARY

One embodiment is directed to a method, which may include sending, by a user equipment, a request message to a network node. The request message may include an indication that the user equipment wants to obtain a preamble for contention based access (CBA) data transmission and not for full network access. The method may then include receiving an allocation of the preamble for contention based access (CBA) from the network node.

Another embodiment is directed to an apparatus including at least one processor, and at least one memory including computer program code. The at least one memory and computer program code are configured, with the at least one processor, to cause the apparatus at least to send a request message to a network node. The request message comprises an indication that the apparatus wants to obtain a preamble for contention based access (CBA) data transmission and not for full network access. The at least one memory and computer program code may be further configured, with the at least one processor, to cause the apparatus at least to receive an allocation of the preamble for contention based access (CBA) from the network node.

Another embodiment is directed to an apparatus including sending means for sending a request message to a network node. The request message may include an indication that the apparatus wants to obtain a preamble for contention based access (CBA) data transmission and not for full network access. The apparatus may also include receiving means for receiving, from the network node, an indication of the preamble for contention based access (CBA) allocated to the apparatus.

Another embodiment is directed to a method, which may include receiving, by a network node, a request message from a user equipment. The request message may include an indication that the user equipment wants to obtain a preamble for contention based access (CBA) data transmission and not full network access. When contention based access (CBA) preambles or resources are available, the method may include allocating a contention based access (CBA) preamble to the user equipment. The method may then include sending, to the user equipment, an indication of the contention based access (CBA) preamble allocated for the user equipment.

Another embodiment is directed to an apparatus including at least one processor and at least one memory including computer program code. The at least one memory and computer program code are configured, with the at least one processor, to cause the apparatus at least to receive a request message from a user equipment. The request message may include an indication that the user equipment wants to obtain a preamble for contention based access (CBA) data transmission and not full network access. When contention based access (CBA) preambles or resources are available, the at least one memory and computer program code are configured, with the at least one processor, to cause the apparatus at least to allocate a contention based access (CBA) preamble to the user equipment, and to send, to the user equipment, an indication of the contention based access (CBA) preamble allocated for the user equipment.

Another embodiment is directed to an apparatus that may include receiving means for receiving a request message from a user equipment. The request message may include an indication that the user equipment wants to obtain a preamble for contention based access (CBA) data transmission and not full network access. When contention based access (CBA) preambles or resources are available, the apparatus may include allocating means for allocating a contention based access (CBA) preamble to the user equipment, and sending means for sending, to the user equipment, an indication of the contention based access (CBA) preamble allocated for the user equipment.

BRIEF DESCRIPTION OF THE DRAWINGS

For proper understanding of the invention, reference should be made to the accompanying drawings, wherein.

DETAILED DESCRIPTION:

It will be readily understood that the components of the invention, as generally described and illustrated in the figures herein, may be arranged and designed in a wide variety of different configurations. Thus, the following detailed description of embodiments of systems, methods, apparatuses, and computer program products of preamble sequence management for contention based access, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Figure 1:
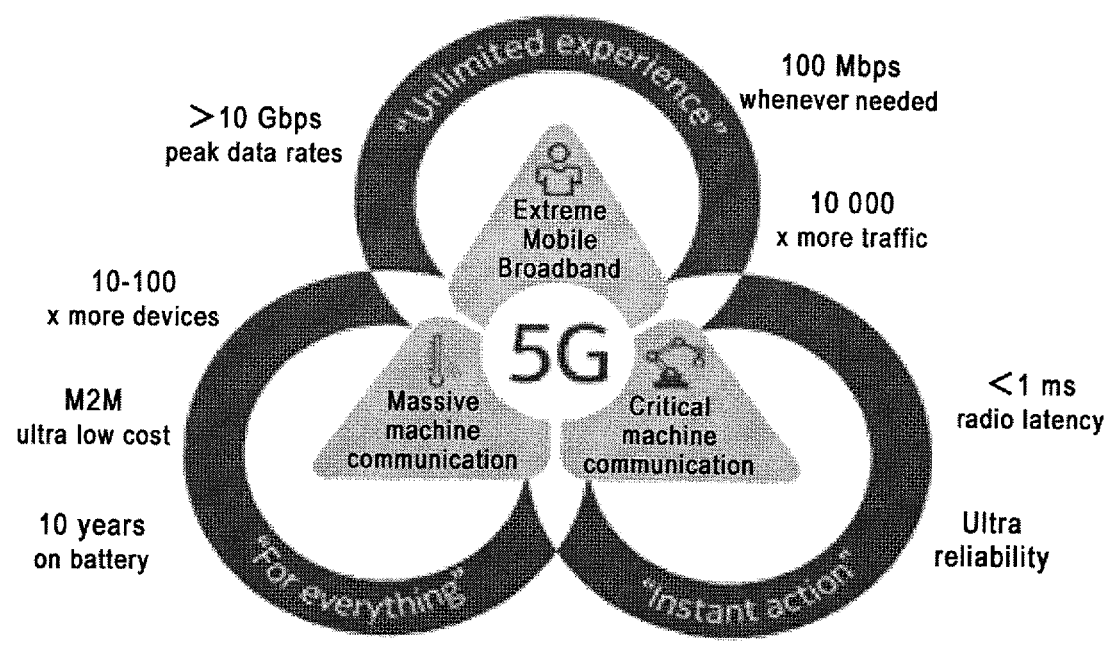
FIG. 1 illustrates some examples of 5G use cases and key performance indicators (KPIs)

Certain embodiments of the invention relate to 5G new radio (NR), contention based access (CBA), small packet transmission, and/or machine type communication (MTC). Within the telecommunications industry, it has been widely agreed that, in addition to enhancing the conventional mobile broadband services, 5G networks will support new emerging services and applications as well. For instance, FIG. 1 illustrates some possibilities for 5G use cases and key performance indicators (KPIs). Connecting "for everything" or massive machine type communications (mMTC) is a typical future internet of things (IoT) related use case. As shown in FIG. 1, the most relevant KPIs include user density, much improved battery life, and ultra-low cost.

Usually, the traffic for mMTC devices are quite infrequent and in most cases the packet size is quite small, such as in utility meter reading. Contention based access is a promising candidate to support mMTC with clear benefits in terms of control signaling overhead, transmission latency, UE power consumption and so on.

Contention based access is currently studied in 3GPP RAN1 5G NR. It was agreed in RAN1#85 meeting that, autonomous/grant-free/contention based UL non-orthogonal multiple access has the following characteristics: a transmission from UE does not need the dynamic and explicit scheduling grant from eNB, and multiple UEs can share the same time and frequency resources. It was also agreed that, for autonomous/grant-free/contention based UL non-orthogonal multiple access, the following should be studied: collision of time/frequency resources from different UEs, solutions potentially including, for example, code, sequence, interleaver pattern; uplink (UL) synchronization (downlink (DL) synchronization assumed)—Case 1 is where timing offsets between UEs are within a cyclic prefix, and Case 2 is where Timing offsets between UEs can be greater than a cyclic prefix, and for future study is the exact model of timing offsets; requirement for power control—Case 1 is perfect open-loop power control, i.e., equal average SNR between UEs for potentially link level calibration, Case 2 is realistic open-loop power control with certain alpha and P0 values, and Case 3 is close-loop power control; and the receiver impact.

Figure 2:
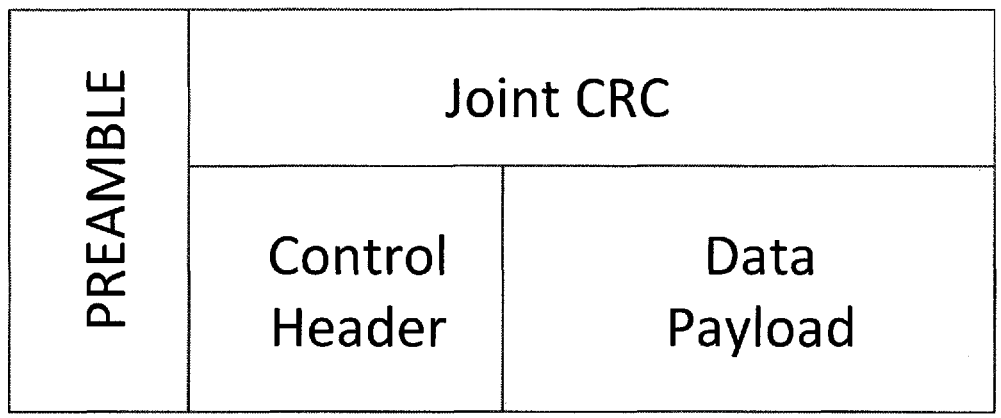
FIG. 2 illustrates a block diagram of an example preamble transmission.

In certain approaches to contention based access, it is assumed that the preamble is transmitted together with data, as illustrated in FIG. 2. The preamble may be used for UE identification (and for UL timing estimation), which means that the preamble should be unique within a certain geographical area, for example, in a cell or in one area similar as conventional "tracking area." The most difficult problem with having a UE-unique preamble within a large area is the preamble design. This is because in a case where there are a massive number of devices, it can be really challenging to have a UE-unique preamble sequence in a large area. Accordingly, a much simpler technique is to have, for example, a UE-unique preamble sequence within one cell. In this case, the effort for preamble sequence design can be reduced compared to the case where the UE possesses a unique preamble sequence in a large area.

Another aspect relates to radio resource control (RRC) state. The issue to be answered is under which RRC state a UE can use contention based access for data transmission. Under certain approaches, it has been assumed that both a UE in RRC_Connected and a UE in RRC_Flex (a middle state between RRC_Connected and Idle state) can transmit small packet with the help of contention based access. It is noted that RRC_Flex is one example name of the new RRC state comparing to, e.g., LTE. In an embodiment, RRC_Flex refers to a middle state between RRC_Connected and Idle state, and this state may be referred to by different names or terms according to other embodiments.

A problem is that, in case of RRC_Flex, the UE is known to the network at a level of a so-called Tracking RAN Area (TRA) which can be composed of relatively many cells. In this case, in order to have a UE-unique preamble sequence in one cell, the UE needs to be known to the network at cell level. This means that every time one mMTC device moves from one cell to another, it has to perform handover (HO) and obtain the preamble sequence used for contention based access if no new procedure is introduced. Hence, one MTC device will have one unique preamble sequence in one cell and during HO, this device has to inform the target cell about its presence and involvement in contention based access. Clearly, this will bring unnecessary signalling exchange and additional power consumption, especially if the UE is just trying to get the preamble sequence for contention based access. Certain embodiments of the invention are able to solve this problem of how to avoid, for example, full HO/RACH process for a UE with RRC_Flex state or Idle state and how to obtain unique preamble sequence for contention based access without entering RRC_Connected state.

Certain embodiments of the invention provide a registration procedure for contention based access (CBA) preamble sequence allocation. More specifically, in an embodiment, when a UE is moving from one cell to the next cell (within the same radio tracking area in case of RRC_FLEX), in order for the UE to use contention based resource pools (RPs), a modified random access procedure is provided. For instance, in one embodiment, the modified random access procedure may include the UE sending a random access procedure (RACH) message indicating that the purpose is not for full network access, but that the UE would like to obtain preamble for contention based data transmission. In this way, the minimum information that needs to be delivered to the new cell is the UE ID. Based on this, the new cell can link the CBA preamble with the UE ID.

According to some embodiments, at least two alternatives for a CBA preamble request are proposed. One embodiment may extend the legacy two-stage RA for CBA preamble request/allocation. Alternatively, in another embodiment, a one stage method can be applied as well where it brings more changes compared to legacy RACH procedure in LTE.

In addition, certain embodiments also provide different alternative ways to release the allocated CBA preamble sequence after HO to the new cell. Also, some embodiments combine new CBA preamble allocation at the target BS and old CBA preamble release.

According to an embodiment, there may be two types of preambles: a random access (or RACH) preamble that is similar to LTE RACH preamble; or CBA preamble that is used for contention based data transmission and every UE or a group of UEs will be configured by BS with one unique CBA preamble within one area, for example, in a cell. Certain embodiments of the invention provide different alternatives for CBA preamble request/allocation.

Figure 3:
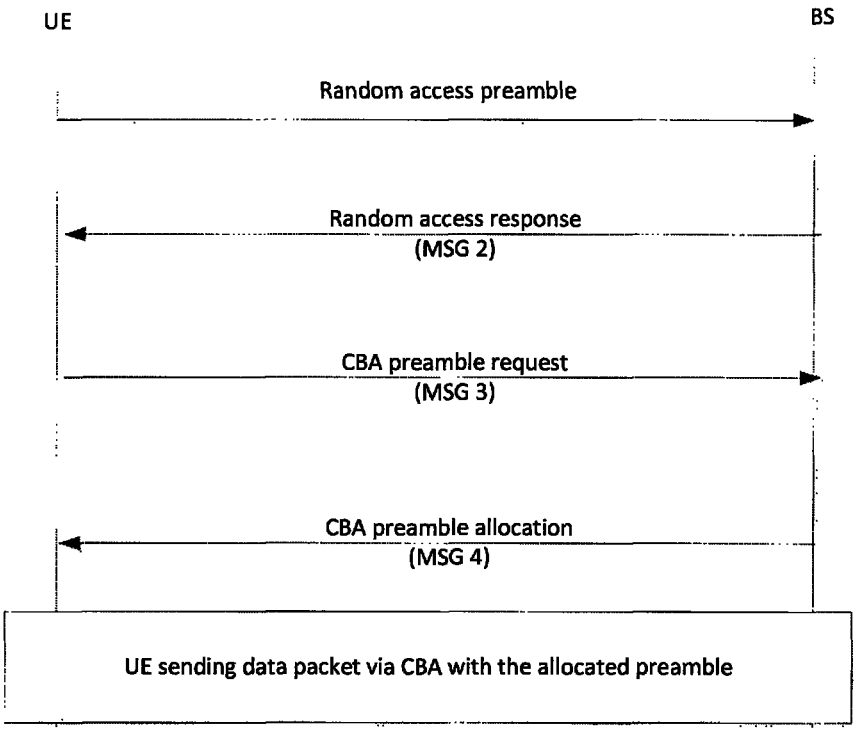
FIG. 3 illustrates a signaling diagram depicting an extended RACH procedure for CBA preamble allocation, according to one embodiment.

FIG. 3 illustrates a signaling diagram depicting an extended RACH procedure for CBA preamble allocation, according to one embodiment. Comparing FIG. 3 to a regular RACH procedure, it can be seen that one difference begins from MSG 3 where the UE just needs to inform the BS that the reason for the process is requesting CBA preamble. Then, in MSG 4, the BS can allocate UE specific CBA preamble to the UE. After MSG 4, there is no need to have follow up RACH steps for RRC connection setup and BS is just detecting the possible CBA data transmission from UEs.

The CBA preamble allocation procedure, according to certain embodiments, may be triggered when the UE reselects to a new cell, even when there is not any data in the UL buffer. This type of CBA preamble allocation procedure may be especially targeted for UEs (e.g., coverage enhancement UEs) whose default access mode is specified to be contention based access or mMTC type of device.

In an embodiment, the MSG3 could be L3 (e.g., RRC) signaling that includes the UE-ID by which the BS (or eNB) could identify the UE and allocate the associated CBA preamble accordingly. The identity may also be used for contention resolution that may take place the same way as with the regular random access procedure, e.g., the UE includes in MSG 3 an identity that BS sends back in MSG 4. The establishment cause indicating the request of the CBA may also be contained in MSG 3 and, therefore, the BS would not proceed with normal connection establishment procedure but respond with CBA allocation instead.

According to one embodiment, within MSG4, apart from the allocated CBA preamble, the radio resource reserved for CBA transmission may be informed to the UE. From this reserved radio resource, the UE may send UL data if the UE has not obtained such information from other means, such as a broadcast message.

In an embodiment, after obtaining the necessary information for CBA transmission (preamble and resource), the UE may then start the connection resume procedure via CBA when there is mobile originated (MO) data. In this case, the UE may send the L3 RRC Connection Resume Request via CBA without performing the legacy RA procedure (the RA may required for regular RRC Connection Resume procedure, and RRC Connection Resume Request message is MSG3 during the RA).

Figure 4:
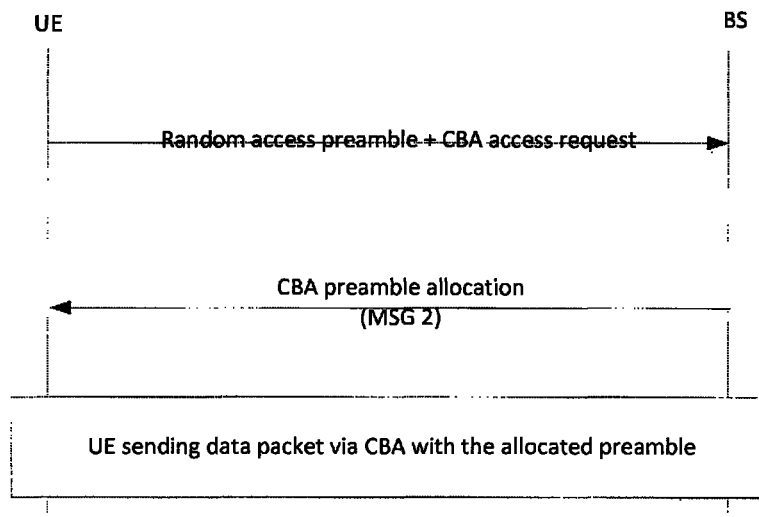
FIG. 4 illustrates a signaling diagram depicting an example of an optimized procedure for CBA preamble request, according to one embodiment.

FIG. 4 illustrates a signaling diagram depicting an example of an optimized procedure for CBA preamble request, according to one embodiment. Since one of the purposes for the procedure is to request UE specific preamble, if the indication of CBA access request and the necessary information can already be delivered in the very first step, there is no need to follow regular RACH procedure. As illustrated in the example of FIG. 4, if the UE can send all necessary information in the first step including the UE ID and indication of CBA access request, the BS can allocate the CBA preamble to the UE in the second step of the procedure. In order to support the optimized procedure of FIG. 4, the communication system for example future 5G should support, in the first message, both preamble transmission and also a small amount of data. For contention resolution, MSG 2 may include the identity that the UE had sent in the first message.

Another way to handle collision is a timer based approach. In this embodiment, after the UE sends out the first message, if there is no response after a certain time window (defined by the timer), the UE will send the first message again with a randomly selected random access preamble and additionally a random backoff window may be defined as well.

Another alternative is that two types of random access resources are specified in 5G. One is used for regular RACH procedure as in LTE, and a second set of resource for CBA preamble allocation. In this way, there will be no collision between RACH preamble from UEs performing regular RACH and UEs just requesting CBA preamble. And, in this case, there is no need to send the CBA access indication since the resource itself already implicitly indicates the purpose. The resource separation may be done in time, frequency, or code domain. Separation in code domain means that different preamble sequences are used for regular random access and CBA access. Based on the detected preamble, the BS will know the purpose of the transmission.

In order to avoid the situation where one UE will have multiple CBA preambles from different cells due to mobility, for example, one embodiment may provide a procedure for "preamble release". One example for achieving CBA preamble release is to specify an expiry time for a CBA preamble. For example, a UE may start a timer when it receives the CBA preamble allocation and when the timer expires the UE must release the preamble and request a new one, if needed. The timer may be restarted every time the UE successfully sends a packet through CBA. In order to avoid unnecessary releases, the UE may be allowed to send a dummy packet using CBA just for resetting the timer. When the UE moves to the coverage of a new cell, the UE may ask for a new CBA preamble and the old preamble would be automatically released in the expiry of the timer of that preamble. The release timer may also be needed for error situations where, for instance, due to abrupt loss of connection, release of a preamble cannot be signaled.

Figure 5:
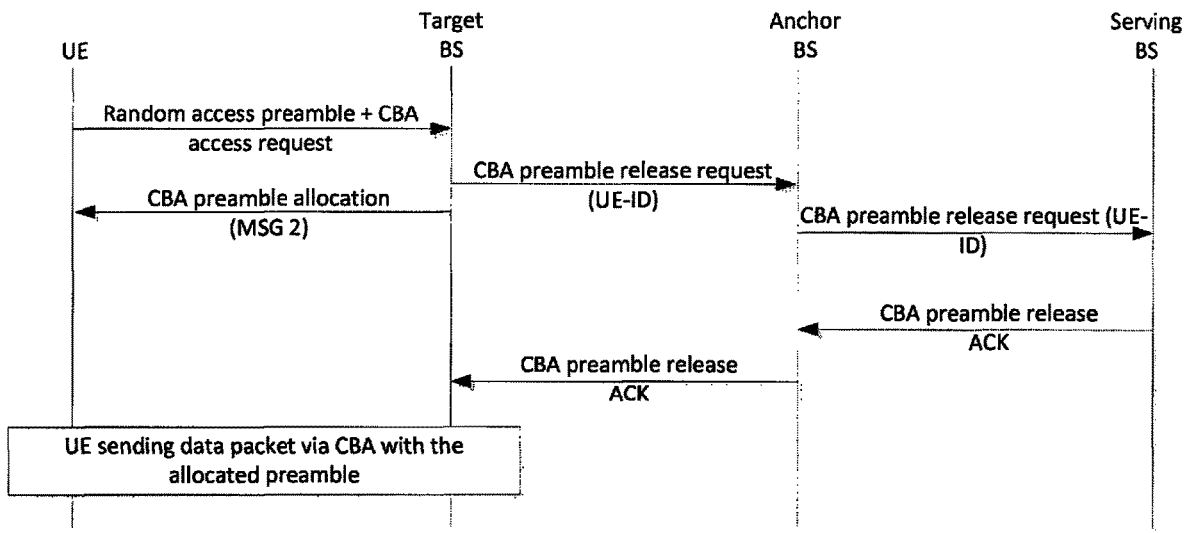
FIG. 5 illustrates a signaling diagram depicting an example of a CBA preamble release procedure, according to an embodiment.
Figure 6:
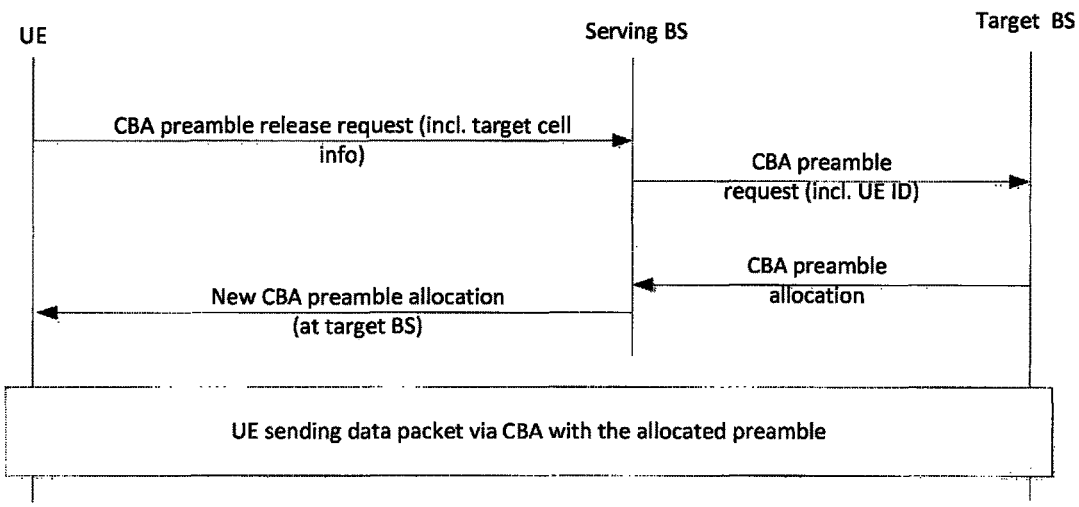
FIG. 6 illustrates an example signaling diagram of a combined CBA preamble request and CBA preamble release, according to an embodiment.

In addition or alternatively to the timer based release, when UE moves out of the cell the release may take place according to other embodiments shown in FIGS. 5 and 6. In both of these embodiments, the Serving BS will be informed that one UE moves out the coverage of the cell of the Serving BS and the CBA preamble of the UE can be allocated to other UEs.

FIG. 5 illustrates a signaling diagram depicting an example of a CBA preamble release procedure, according to an embodiment. When a UE moves from a cell of a Serving BS to a cell of a Target BS, it requests CBA access from the Target BS. Besides allocating a CBA preamble, the Target BS sends a CBA preamble release request to a mobility Anchor BS that forwards the request to the Serving BS. The mobility Anchor stores the UE associated information, and is aware of the UE location change in RAN within the Tracking Area (TA) or a single cell. Therefore, it is assumed that when the Target BS informs the UE mobility information to the Anchor node, the Anchor node knows the Serving eNB of the UE and may requests the release of the allocated CBA preamble in the Serving BS. Alternatively, the release request may be communicated directly from the Target BS to the Source BS without the help of an Anchor BS. In this case, the CBA access request could include the identity of the Serving eNB so that the Target eNB would know where to address the release request.

FIG. 6 illustrates an example signaling diagram of a combined CBA preamble request and CBA preamble release, according to an embodiment. The release procedure or the preamble request/allocation is done before the UE moves out of the serving BS's coverage. The UE may send the CBA preamble release information to the serving BS. This message may have at least two-fold functions: (1) requesting the serving BS to release the CBA preamble, and (2) triggering the serving BS to send the CBA preamble request to target BS on behalf of the UE. Also, the new CBA preamble can be informed (to the UE) through the serving BS (as illustrated in FIG. 6) or informed by the target BS.

According to another embodiment, the UE requests a CBA preamble for the target cell directly from the target BS and indicates to the serving BS about the release only after receiving the CBA preamble for the target cell.

The benefit of the embodiments that do not rely on timers is that overlapping CBA preamble reservations for multiple cells by one UE are very short or do not exist at all.

Figure 7:
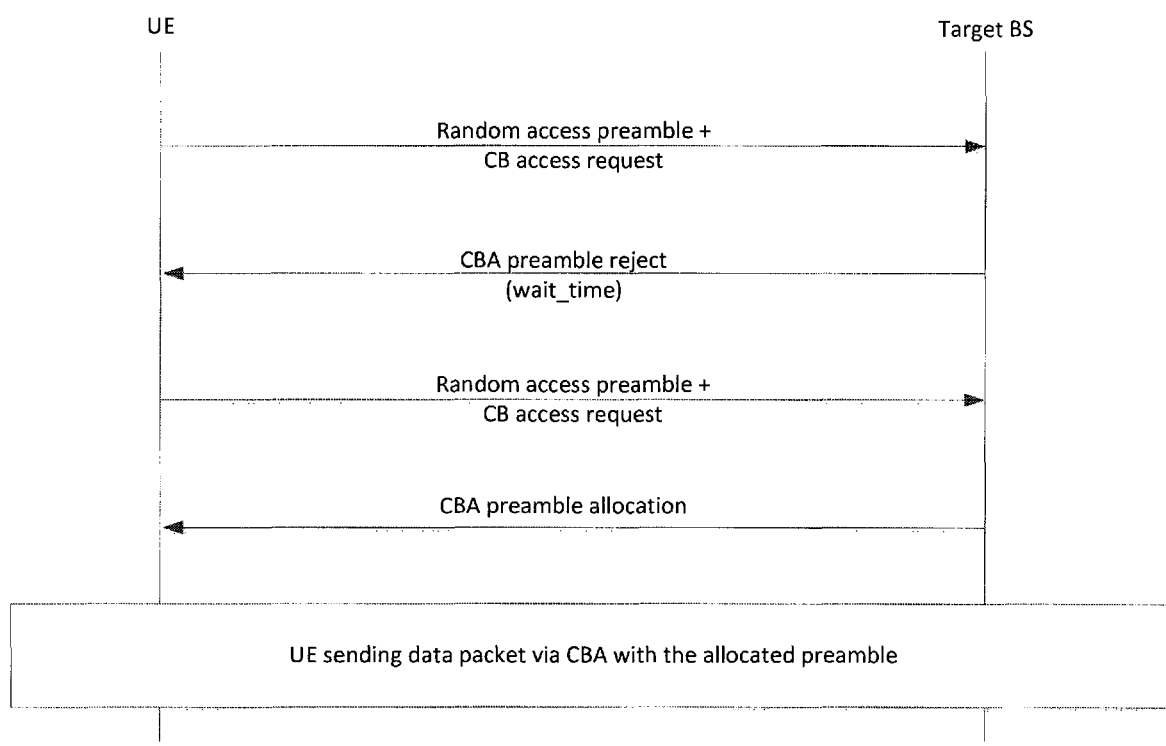
FIG. 7 illustrates an example signaling diagram of a rejected CBA preamble allocation, according to one embodiment.
Figure 8:
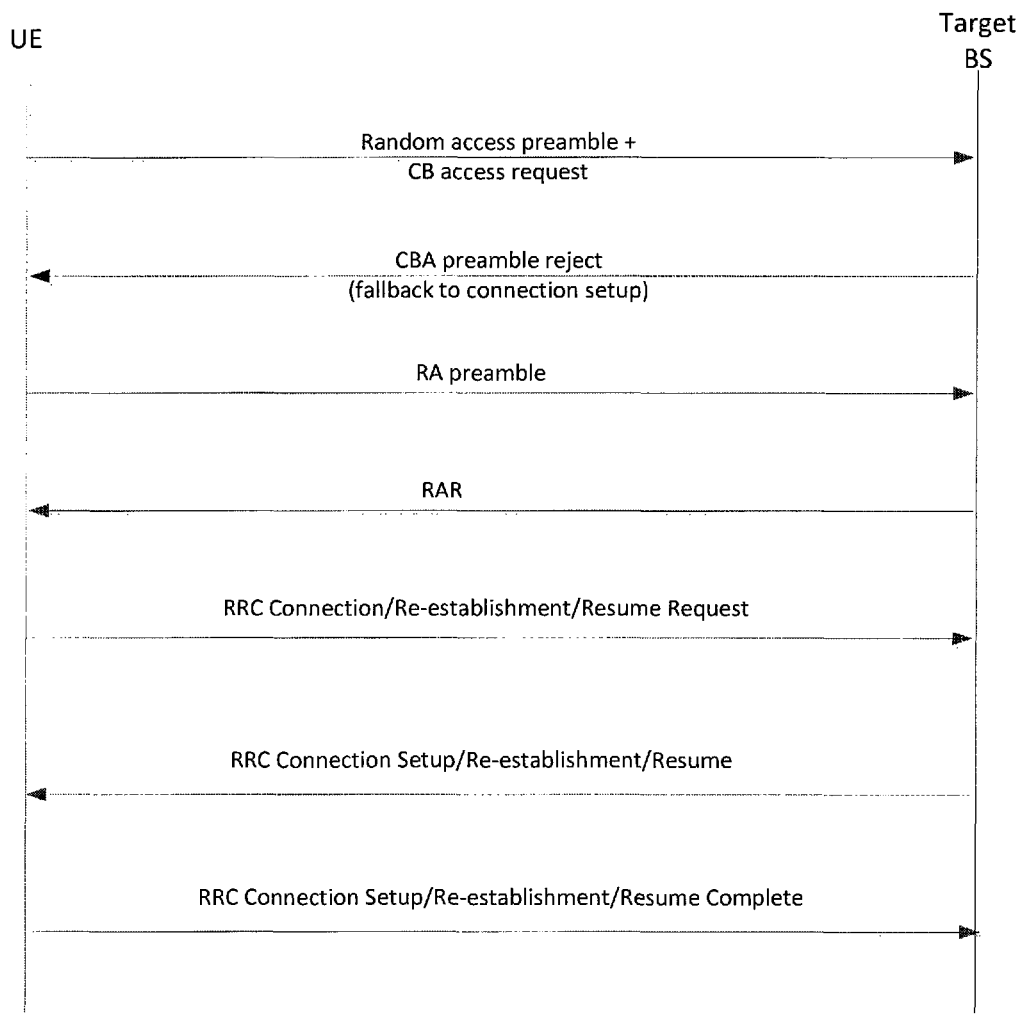
FIG. 8 illustrates an example signaling diagram of a rejected CBA preamble allocation, according to another embodiment.

It should be noted that these preamble release functions may be realized by other Uu (between UE and Nodes) and X2 (between Nodes) messages than those shown in FIG. 5. For instance, the request may be an additional indication or information element (IE) in a Uu/X2 message used for other purposes. As an example, a UE may report location update when moving to a new BS regardless of whether the UE supports CBA or not; then, the CBA preamble release request could be piggybacked within the corresponding Uu/X2 messages optionally by the UE which is capable of CBA transmission. In certain embodiments, the BS may decline a preamble request from a UE for various reasons, such as not enough CBA preambles or resources. The UE may try the preamble request again later with some back off time duration, or the UE perform the regular connection setup procedure instead based on the cause indicated by the BS. FIGS. 7 and 8 illustrate signaling diagrams depicting respective cases for CBA preamble allocation that is rejected by the BS.

Figure 9A:
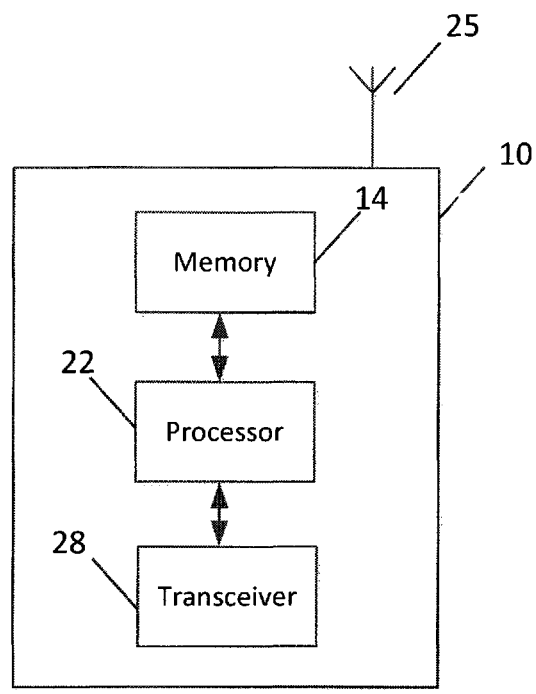
FIG. 9*a* illustrates a block diagram of an apparatus, according to one embodiment.

FIG. 9a illustrates an example of an apparatus 10 according to an embodiment. In an embodiment, apparatus 10 may be a node, host, or server in a communications network or serving such a network. For example, apparatus 10 may be a network node or access node for a radio access network, such as a base station, node B or eNB, or an access node of 5G radio access technology. Thus, in certain embodiments, apparatus 10 may include a base station, access node, node B or eNB serving a cell. It should be noted that one of ordinary skill in the art would understand that apparatus 10 may include components or features not shown in FIG. 9a.

As illustrated in FIG. 9a, apparatus 10 may include a processor 22 for processing information and executing instructions or operations. Processor 22 may be any type of general or specific purpose processor. While a single processor 22 is shown in FIG. 9a, multiple processors may be utilized according to other embodiments. In fact, processor 22 may include one or more of general-purpose computers, special purpose computers, microprocessors, digital signal processors (DSPs), field-programmable gate arrays (FP- GAs), application-specific integrated circuits (ASICs), and processors based on a multi-core processor architecture, as examples.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. The transceiver 28 may include, for example, a plurality of radio interfaces that may be coupled to the antenna (s) 25. The radio interfaces may correspond to a plurality of radio access technologies including one or more of LTE, WLAN, Bluetooth, BT-LE, NFC, radio frequency identifier (RFID), ultra-wideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station, node B or eNB, or an access node of 5G, for example. According to one embodiment, apparatus 10 may be controlled by memory 14 and processor 22 to perform the functions associated with embodiments described herein. For instance, in an embodiment, apparatus 10 may be controlled by memory 14 and processor 22 to receive a request message (or CBA preamble request message) from a user equipment. According to one embodiment, the request message may be, for example, a RACH message, such as MSG3 illustrated in FIG. 3. According to another embodiment, the request message may be, for example, a request for a random access preamble and CBA preamble (i.e., MSG1), as illustrated in FIG. 4. The request message may include an indication that the user equipment wants to obtain a preamble for contention based access (CBA) data transmission and does not want full network access.

In one embodiment, apparatus 10 may be further controlled by memory 14 and processor 22 to, when contention based access (CBA) preambles or resources are available, allocate a contention based access (CBA) preamble to the user equipment and to send, to the user equipment, an indication of the contention based access (CBA) preamble allocated for the user equipment. According to certain embodiments, the contention based access (CBA) preamble allocated for the user equipment is unique to the user equipment within a cell served by apparatus 10. In some embodiments, the request message received from the user equipment may contain an indication of the identifier (ID) of the user equipment (i.e., UE ID).

In certain embodiments, apparatus 10 may be further controlled by memory 14 and processor 22 to link the contention based access (CBA) preamble allocated for the user equipment with the identifier (ID) of the user equipment. According to an embodiment, apparatus 10 may be further controlled by memory 14 and processor 22 to receive data packet(s), from the user equipment, via contention based access (CBA) using the contention based access (CBA) preamble allocated for the user equipment.

According to some embodiments, apparatus 10 may be further controlled by memory 14 and processor 22 to send an indication, to the user equipment, of radio resources reserved for the contention based access (CBA) data transmission, and to receive the data packet(s) over the reserved radio resources. In one embodiment, when the user equipment moves out of a cell served by apparatus 10, then apparatus 10 may be further controlled by memory 14 and processor 22 to receive a message informing apparatus 10 that the contention based access (CBA) preamble allocated for the user equipment should be released for reallocation to other user equipment.

Figure 9B:
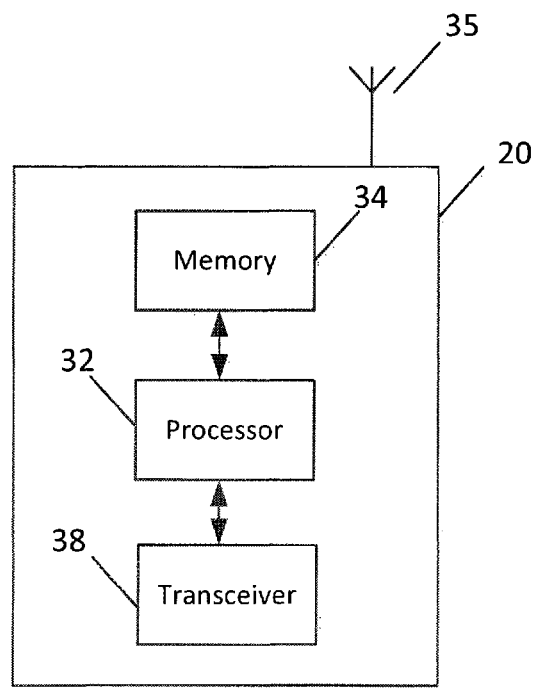
FIG. 9*b* illustrates a block diagram of an apparatus, according to another embodiment.

FIG. 9*b* illustrates an example of an apparatus 20 according to another embodiment. In an embodiment, apparatus 20 may be a node or element in a communications network or associated with such a network, such as a UE, mobile device, stationary device, or other device. A UE may be often referred to as, for example, mobile stations, mobile units, subscriber stations, wireless terminals, tablets, smart phones, devices, or the like. Apparatus 10 may be implemented as, for example, a wireless handheld device, a wireless plug-in accessory, or the like. In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be UE configured to operate using one or more radio access technologies, such as LTE, LTE-A, 5G, WLAN, WiFi, Bluetooth, NFC, and any other radio access technologies. Moreover, apparatus 20 may be configured to have established connections to access points using a plurality of the radio access technologies. It should be noted that one of ordinary skill in the art would understand that apparatus 20 may include components or features not shown in FIG. 9*b*.

As illustrated in FIG. 9*b,* apparatus 20 may include a processor 32 for processing information and executing instructions or operations. Processor 32 may be any type of general or specific purpose processor. While a single processor 32 is shown in FIG. 9*b,* multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for receiving a downlink or signal and for transmitting via an uplink from apparatus 20. Apparatus 20 may further include a transceiver 38 configured to transmit and receive information. The transceiver 38 may also include a radio interface (e.g., a modem) coupled to the antenna 35. The radio interface may correspond to a plurality of radio access technologies including one or more of LTE, LTE-A, 5G, WLAN, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly. Apparatus 20 may further include a user interface.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a UE, for example. In this embodiment, apparatus 20 may be controlled by memory 34 and processor 32 to perform the functions associated with embodiments described herein. In one embodiment, apparatus 20 may be controlled by memory 34 and processor 32 to send a request message (or CBA preamble request message) to a network node, such as a base station, access point, node B, or eNB. According to one embodiment, the request message may be, for example, a RACH message, such as MSG3 illustrated in FIG. 3. According to another embodiment, the request message may be, for example, a request for a random access preamble and CBA preamble (i.e., MSG1), as illustrated in FIG. 4. The request message may include an indication that the apparatus 20 wants to obtain a preamble for contention based access (CBA) data transmission and does not want full network access. In an embodiment, apparatus 20 may then be controlled by memory 34 and processor 32 to receive an allocation of the preamble for contention based access (CBA) from the network node.

According to one embodiment, apparatus 20 may be moving from one cell to the next cell (e.g., within the same radio tracking area in case of RRC_FLEX), when apparatus 20 sends the request message to the network node serving the next cell to use contention based resource pools. Hence, in some embodiments, the sending of the request message may be triggered by apparatus 20 moving to a new cell (even if there is not data in UL buffer).

In an embodiment, after receiving the allocated CBA preamble, apparatus 20 may be controlled by memory 34 and processor 32 to transmit data via contention based access (CBA) using the allocated preamble. According to some embodiments, the allocated CBA preamble is unique to apparatus 20 within the cell.

In one embodiment, apparatus 20 may be controlled by memory 34 and processor 32 to send an identifier (ID) of apparatus 20 (e.g., UE ID) to the network node serving the cell. The ID may be included in the initial CBA request message or may be included in a subsequent message sent to the network node. The ID may then be used, for example, for contention resolution.

According to certain embodiments, apparatus 20 may be further controlled by memory 34 and processor 32 to receive an indication, from the network node, of radio resources reserved for the contention based access (CBA) data transmission. As a result, apparatus 20 may then transmit data using the reserved radio resources. After obtaining the necessary information for CBA transmission (i.e., CBA preamble and resources), apparatus 20 may then start a connection resume procedure via CBA when there is MO data. In this embodiment, apparatus 20 may be further controlled by memory 34 and processor 32 to send a RRC Connection Resume Request via CBA without performing legacy RA procedure.

In some embodiments, when the allocation of the preamble is not received within a certain time period, apparatus 20 may be further controlled by memory 34 and processor 32 to re-send the CBA request message with a randomly selected random access preamble. In other embodiments, apparatus 20 may be further controlled by memory 34 and processor 32 to start a timer when the allocation of the CBA preamble is received and, when the timer reaches a certain threshold defined as an expiry time of the timer, apparatus 20 may be controlled to release the allocated CBA preamble.

According to one embodiment, when apparatus 20 moves out of a cell, apparatus 20 may be further controlled by memory 34 and processor 32 to inform the cell that the preamble allocated for CBA should be released for reallocation to other user equipment. In another embodiment, when apparatus 20 expects or is about to move to a new cell, apparatus 20 may be further controlled by memory 34 and processor 32 to inform the current cell that the is preamble allocated for CBA should be released for reallocation to other user equipment. In yet another embodiment, apparatus 20 may be further controlled by memory 34 and processor 32 to inform the current cell that the preamble allocated for CBA should be released only after receiving a CBA preamble from the new cell.

Figure 10A:
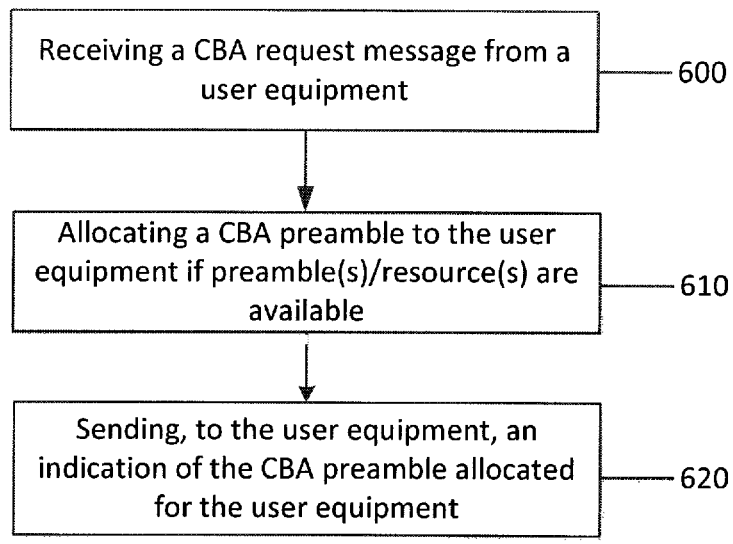
FIG. 10*a* illustrates an example flow diagram of a method, according to one embodiment.

FIG. 10*a* illustrates an example of a flow chart for a method, according to one embodiment. In certain embodiments, the method depicted in FIG. 10*a* may be performed by a network node, such as a base station or eNB, for example. As illustrated in FIG. 10*a*, the method may include, at 600, receiving a CBA request message from a user equipment. The CBA request message may include an indication that the user equipment wants to obtain a preamble for CBA data transmission and is not seeking full network access. When CBA preambles or resources are available, the method may include, at 610, allocating a CBA preamble to the user equipment. The method may then include, at 620, sending, to the user equipment, an indication of the CBA preamble allocated for the user equipment.

In certain embodiments, the CBA preamble allocated for the user equipment is unique to the user equipment within a cell served by the network node. According to one embodiment, the method may further include receiving an identifier (ID) of the user equipment in the CBA request message or in a separate message from the user equipment. According to some embodiments, the method may also include linking the CBA preamble allocated for the user equipment with the identifier (ID) of the user equipment.

According to some embodiments, the method may also include receiving data packet(s), from the user equipment, via CBA using the CBA preamble allocated for the user equipment. In certain embodiments, the method may also include sending an indication, to the user equipment, of radio resources reserved for the contention based access (CBA) data transmission, and receiving the data packet(s) from the user equipment over the reserved radio resources.

According to an embodiment, when the user equipment moves out of a cell served by the network node, the method may include receiving a message informing the network node that the CBA preamble allocated for the user equipment should be released for reallocation to other user equipment.

Figure 10B:
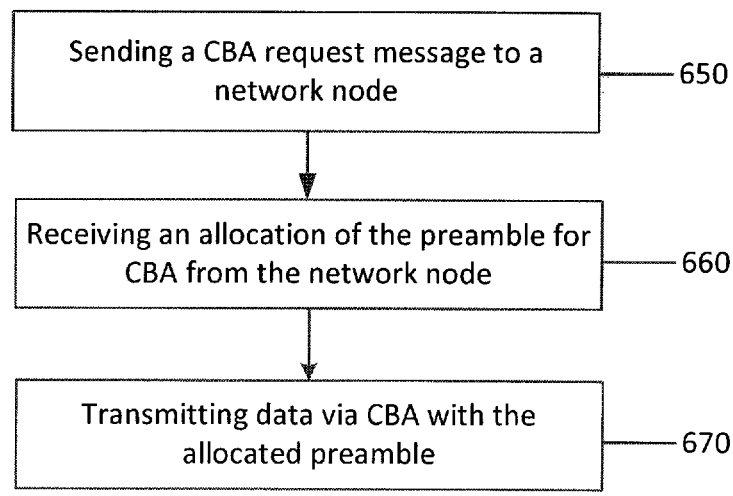
FIG. 10*b* illustrates an example flow diagram of a method, according to another embodiment.

FIG. 10*b* illustrates an example of a flow chart for a method, according to one embodiment. In certain embodiments, the method depicted in FIG. 10*b* may be performed by a user device or user equipment, such as a mobile device or stationary device, for example. As illustrated in FIG. 10*b*, the method may include, at 650, sending a CBA request message to a network node. The CBA request message may include an indication that the user equipment wants to obtain a preamble for CBA data transmission and is not seeking full network access. In certain embodiments, the CBA request message may be sent when the user equipment is moving from one cell to a new cell served by the network node.

The method may then include, at 660, receiving an allocation of the preamble for contention based access (CBA) from the network node. The allocated preamble for CBA may be unique to the user equipment within a cell. According to one embodiment, the method may further include sending an identifier (ID) of the user equipment in the CBA request message or in a separate message sent to the network node. The ID of the user equipment may then be used for contention resolution.

In an embodiment, the method may also include, at 670, transmitting data via CBA with the allocated preamble. According to some embodiments, the method may include receiving an indication, from the network node, of radio resources reserved for the CBA data transmission, and transmitting the data using the reserved radio resources.

In one embodiment, when the allocation of the CBA preamble is not received within a certain time period, the method may include re-sending the CBA request message with a randomly selected random access preamble. According to certain embodiments, the method may also include starting a timer when the allocation of the preamble is received and, when the timer reaches a certain threshold defined as an expiry time of the timer, releasing the allocated CBA preamble so it may be reused. In an embodiment, when the user equipment moves out of a cell, the method may include informing the cell that the preamble allocated (to the user equipment) for CBA should be released for reallocation to other user equipment.

Therefore, embodiments of the invention provide several advantages and/or technical improvements. For example, the use of embodiments of the invention can result in improved throughput and optimized load balancing, and the like, thereby improving the functioning of communications networks and their nodes. For example, according to example embodiments, the UE can acquire timely preamble allocation from a new serving BS or eNB, and perform the contention based transmission once there is UL data in the buffer to reduce the latency. Meanwhile, the old serving BS or eNB may release a reserved preamble for the UE that moves out of its coverage area, and those released preamble(s) can then be allocated to other UEs capable of contention based transmission. It is assumed the RAN initiated paging will be supported in 5G, i.e., where the anchor node forwards paging message to all the base stations within a certain area when there is DL data. By requesting the release of preamble to the anchor node, the anchor node can obtain the latest location of the UE. Therefore, with the exact position of UE, the anchor just needs to send a paging request to the new BS to thereby ysave signaling overhead over backhaul and radio interface.

In some embodiments, the functionality of any of the methods, processes, signaling diagrams, or flow charts described herein may be implemented by software and/or computer program code or portions of code stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method, comprising:
   sending, by a user equipment in a first state different from a radio resource control connected state, a preamble request message to a network node,
   receiving, in response to the preamble request message an allocation of a preamble sequence for contention based access data transmission in the first state from the network node; and
   transmitting a preamble release information to the network node, wherein the preamble release information requests the network node to release the allocated preamble sequence and triggers the network node to request, from a target network node, a further preamble sequence for contention based access data transmission for the user equipment.

2. The method according to claim 1, wherein the sending comprises sending the request in a resource granted for the user equipment as a response to a random access preamble transmission.

3. The method according to claim 1, further comprising transmitting data via contention based access with the allocated preamble sequence.

4. The method according to claim 1, further comprising: receiving the further preamble sequence from the network node or the target network node.

5. The method according to claim 1, wherein the preamble request message is a random access procedure message.

6. An apparatus, comprising:
   at least one processor; and
   at least one memory including computer program code, wherein the at least one memory and computer program code are configured, with the at least one processor, to cause the apparatus at least to
   send in a first state different from a radio resource control connected state a preamble request message to a network node;
   receive in response to the preamble request message an allocation of a preamble sequence for contention based access data transmission in the first state from the network node; and
   transmit a preamble release information to the network node, wherein the preamble release information requests the network node to release the allocated preamble sequence and triggers the network node to request, from a target network node, a further preamble sequence for contention based access data transmission for the apparatus.

7. The apparatus according to claim 6, wherein the at least one memory and computer program code are configured, with the at least one processor, to cause the apparatus at least to send the request in a resource granted as a response to a random access preamble transmission.

8. The apparatus according to claim 6, wherein the at least one memory and computer program code are further configured, with the at least one processor, to cause the apparatus at least to transmit data via contention based access with the allocated preamble sequence.

9. The apparatus according to claim 8, wherein the at least one memory and computer program code are further configured, with the at least one processor, to cause the apparatus at least to:
   receive an indication, from the network node, of radio resources reserved for the contention based access data transmission, and wherein the data is transmitted using the reserved radio resources.

10. The apparatus according to claim 6, wherein the allocated preamble sequence for contention based access is unique to the apparatus or shared with other apparatuses within an area.

11. The apparatus according to claim 6, wherein the at least one memory and computer program code are further configured, with the at least one processor, to cause the apparatus at least to receive the further preamble sequence from the network node or the target network node.

12. The apparatus according to claim 6, wherein the at least one memory and computer program code are further configured, with the at least one processor, to cause the apparatus at least to send the preamble request message when the apparatus is moving from one cell to a new cell served by the network node.

13. The apparatus according to claim 6, wherein, when the preamble sequence for contention based access allocated to the apparatus is not received within a certain time period, the at least one memory and computer program code are further configured, with the at least one processor, to cause the apparatus at least to re-send the preamble request message with a randomly selected random access preamble.

14. The apparatus according to claim 6, wherein the at least one memory and computer program code are further configured, with the at least one processor, to cause the apparatus at least to: start a timer when the preamble sequence for contention based access allocated to the apparatus is received; and when the timer reaches a certain threshold defined as an expiry time of the timer, release the allocated preamble sequence.

15. An apparatus, comprising:
at least one processor; and
at least one memory including computer program code, wherein the at least one memory and computer program code are configured, with the at least one processor, to cause the apparatus at least to:
receive a preamble request message from a user equipment in a first state different from a radio resource control connected state
based on contention based access preambles or resources being available, allocate a contention based access preamble sequence to the user equipment in response to the preamble request message;
send, to the user equipment, an indication of the contention based access preamble sequence allocated;
receive a preamble release information from the user equipment; and
in response to the preamble release information, request, from a target network node, a further preamble sequence for contention based access data transmission for the user equipment.

16. The apparatus according to claim 15, wherein the contention based access preamble sequence allocated for the user equipment is unique to the user equipment within a cell served by the apparatus.

17. The apparatus according to claim 15, wherein the at least one memory and computer program code are further configured, with the at least one processor, to cause the apparatus to perform:
receiving the further preamble sequence from the target network node; and
sending the further preamble sequence to the user equipment.

18. The apparatus according to claim 17, wherein the at least one memory and computer program code are further configured, with the at least one processor, to cause the apparatus at least to link the contention based access preamble sequence allocated for the user equipment with the identifier of the user equipment.

19. The apparatus according to claim 15, wherein the at least one memory and computer program code are further configured, with the at least one processor, to cause the apparatus at least to receive at least one data packet, from the user equipment, via contention based access using the contention based access preamble sequence allocated for the user equipment.

20. The apparatus according to claim 19, wherein the at least one memory and computer program code are further configured, with the at least one processor, to cause the apparatus at least to:
transmit an indication, to the user equipment, of radio resources reserved for the contention based access data transmission, and
receive the at least one data packet over the reserved radio resources.

* * * * *